Feb. 27, 1968  C. W. NOWICKI  3,370,322
BLOW MOLDING APPARATUS
Filed Aug. 16, 1963  2 Sheets-Sheet 1
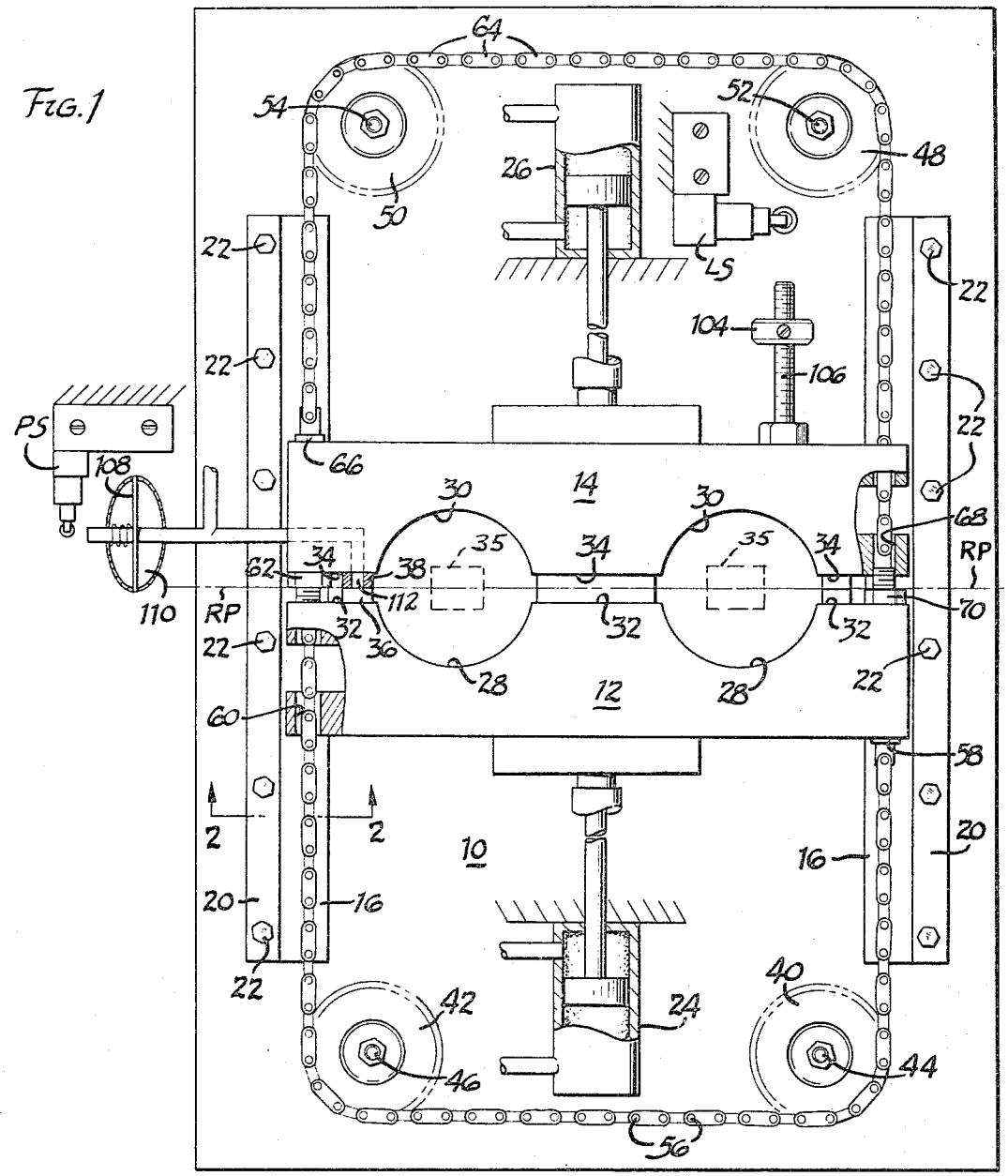
INVENTOR.
CASIMIR W. NOWICKI
BY
ATTORNEYS Feb. 27, 1968   C. W. NOWICKI   3,370,322
BLOW MOLDING APPARATUS
Filed Aug. 16, 1963   2 Sheets-Sheet 2

INVENTOR.
CASIMIR W. NOWICKI
BY
ATTORNEYS

United States Patent Office 3,370,322
Patented Feb. 27, 1968

3,370,322
BLOW MOLDING APPARATUS
Casimir William Nowicki, Toledo, Ohio, assignor to
Owens-Illinois, Inc., a corporation of Ohio
Filed Aug. 16, 1963, Ser. No. 302,688
6 Claims. (Cl. 18—5)

This invention relates to blow molding apparatus, and more particularly to apparatus for controlling the movement of mold half platens toward and away from each other during the mold opening and mold closing stages of the blow molding operation.

The invention is particularly directed to a molding operation, such as the formation of a plastic bottle, wherein a parison is positioned between a pair of open mold halves, and the mold halves are then closed to enclose the parison. Air is then introduced into the parison to expand the parison against the closed mold walls, and after the blowing operation, the mold halves are retracted to their open position.

At the time the parison is moved into position between the open mold halves, the plastic material of the parison is at a temperature substantially higher than the temperature of the mold halves. If one of the mold halves moves into its mold closed position ahead of the other mold half, the heated plastic material of the parison is subjected to uneven cooling which results in a lack of uniformity in the completed molded article. Thus, in addition to achieving an exact positioning of the mold halves relative to the parison support structure in the mold closed position, it is also desirable that the mold halves are precisely synchronized in movement toward and away from the closed position in order to avoid uneven cooling of the molded article.

Accordingly, it is an object of the present invention to provide a blow molding apparatus wherein movement of mold half platens toward and away from each other is precisely regulated in a fashion such that the mold halves are maintained at all times at exactly equal distances from a stationary centrally located reference plane.

It is another object of the invention to provide blow molding apparatus wherein both mold platens are driven by individual motor means and wherein motion of the platens relative to a stationary frame is controlled by mechanism other than the motors.

Still another object of the invention is to provide a blow molding apparatus having precisely determined mold open and mold closed positions, and wherein the mold halves are accurately constrained to equal and opposite motion during movement between the mold open and mold closed positions.

The foregoing, and other objects, are achieved in a blow molding apparatus wherein a pair of mold half platens are mounted upon a stationary frame for guided movement toward and away from each other. A hydraulic motor is coupled to each platen to drive the platen in movement in either direction and the motors are actuated through a hydraulic circuit in a manner such that the platens are moved simultaneously toward or simultaneously away from each other. A pair of sprockets are mounted in the apparatus frame for free rotation about vertical axes located rearwardly of each platen. An inextensible chain is coupled at one end to a platen and extends rearwardly from the platen in a run extending parallel to the direction of movement of the platen to one of the two sprockets located rearwardly of the platen. The chain is trained around the one sprocket through 90° and extends from the one sprocket to the other of the two sprockets located rearwardly of the platen. The chain is trained around 90° of the second sprocket and then extends forwardly from the second sprocket to the other of the two platens, to which it is secured by an adjustable assembly so that the chain tension may be accurately regulated. A second chain and sprocket arrangement is employed in a reversed mirror image of the first, the two chains and their connections to the platens constituting effectively a single endless chain with oppositely moving opposed runs, one run being connected to one platen and the other run being connected to the other platen. Movement on one of the platens is thus transmitted through the chain to the other platen in a fashion such that both platens must move simultaneously in opposite directions at precisely equal velocities and displacement.

Because of the fact that the chains require the two platens to move in accurately regulated motion toward and away from each other, control apparatus for stopping movement of the platens at their respective open and closed positions can be mounted on a single one of the two platens.

Other objects and features of the invention will become apparent by reference to the following specification and the drawings.

In the drawings:

FIGURE 1 is a top plan view, partially schematic and partially in cross section of a blow molding apparatus embodying the present invention;

FIGURE 2 is a detail cross sectional view taken on line 2—2 of FIGURE 1;

Figure 3:
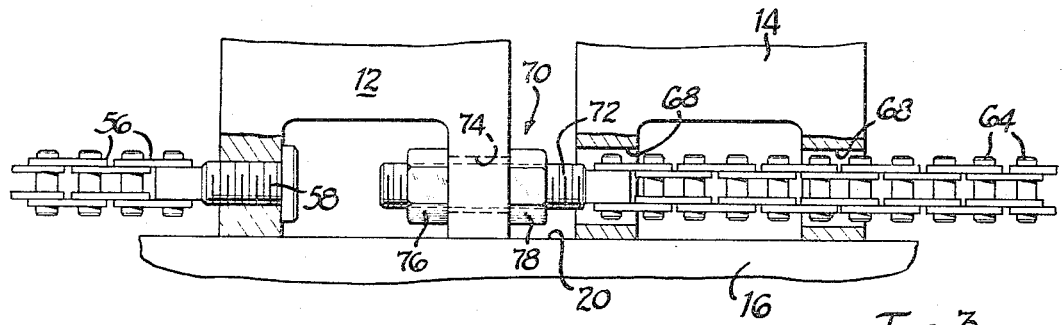
FIGURE 3 is a detail side elevation, partially in section, showing details of the chain coupling to the respective mold platens of the structure of FIGURE 1.

Referring first to FIGURE 1, one form of apparatus embodying the invention includes a stationary frame designated generally 10 upon which a pair of mold half platens 12 and 14 are mounted for horizontal reciprocatory movement toward and away from each other. In the particular apparatus, platens 12 and 14 are supported in track assemblies which include an elongate recessed track block 16 which slidably receives a foot 18 of the platen, the foot being retained in recess block 16 by means of an overlying gib 20 secured as by bolts 22 to block 16. Feet 18 and the engaged surfaces in track block 16 are machined surfaces and track blocks 16 are accurately located in fixed parallel positions upon frame 10 so that platens 12 and 14 are precisely confined to move in an accurately determined path relative to frame 10.

Platens 12 and 14 are driven in reciprocatory movement toward and away from each other along track 16 by hydraulic motors 24 and 26 respectively, whose cylinders are secured in any suitable manner to frame 10, the piston rods of the motors being secured respectively to platens 12 and 14.

As shown in the drawings, platens 12 and 14 do not have the mold halves mounted in them, the mold halves when mounted being located in recesses such as 28 and 30 formed in the front faces 32 and 34 respectively of the platens 12 and 14. In FIGURE 1, the platens are disclosed in their mold closed positions in which front faces 32 and 34 are located at their closest approach to each other and to an imaginary centrally located stationary vertical reference plane indicated on FIGURE 1 at RP, which reference plane is common to the central axes of a pair of parison supports schematically indicated at 35. Parison supports 35 are of conventional construction. Mold platen faces 32 and 34 lie in vertical planes which are parallel to each other and to reference plane RP, and each of the faces is provided with a series of pads such as 36, 38 which engage each other in faceto-face contact when platens 12 and 14 are in their mold closed position.

At a location spaced rearwardly from mold platen 12, a pair of sprockets 40 and 42 are mounted in frame 10 in any suitable manner for free rotation about vertical axes at 44 and 46 respectively. A similar pair of sprockets 48 and 50 are mounted for free rotation about vertical axes 52 and 54 respectively at a location rearwardly of platen 14.

Referring now to FIGURE 3, a first inextensible chain section 56 is connected at one end as by a bolt assembly 58 to platen 12. From bolt 58, referring now to FIGURE 1, chain section 56 extends rearwardly from platen 12 and is trained about sprocket 40 to change direction 90°. From sprocket 40, chain section 56 passes around one quadrant of sprocket 42 and then extends forwardly from sprocket 42 to pass freely through a passage 60 in platen 12 to be secured at its opposite end to platen 14 as by an adjustable nut and bolt assembly 62.

A second inextensible chain section 64 is coupled at one end to platen 14 by a bolt assembly 66, identical in construction to bolt assembly 58. Chain section 64 extends from bolt assembly 66 rearwardly about sprockets 50 and 48 and passes forwardly through a passage 68 in platen 14 to be secured at its other end to platen 12 by an adjustable bolt assembly 70, identical in construction to bolt assembly 62. As best seen in FIGURE 3, bolt assembly 70 includes a threaded shank 72 which is fixedly secured to the end of chain 64. Threaded shank 72 projects freely through a bore 74 formed in platen 12 and a nut 76 threaded on shank 72 is employed to adjust chain 64. A lock nut 78 is also mounted on shank 72 to lock the shank in its adjusted longitudinal position. As stated above, bolt assembly 62 which couples one end of chain 56 to platen 14 is of identical construction to bolt assembly 70.

When in the assembled condition, chain sections 56 and 64 via their connections to the platens, form a single endless chain having oppositely movable runs, one run extending from sprocket 40 to sprocket 48 and the other run extending from sprocket 50 to sprocket 42. That run between sprockets 40 and 48 is connected to platen 12 while the other run is connected to platen 14. Because this "endless chain" is inextensible, movement of the run of the endless chain between sprockets 40 and 48 downwardly as viewed in FIGURE 1 necessarily requires that the run of the endless chain between sprockets 42 and 50 must move upwardly as viewed in FIGURE 1 at an equal velocity and through a precisely equal displacement. Because the run of the "endless chain" which extends between sprockets 48 and 40 is coupled only to platen 12, while the run of the endless chain between sprockets 42 and 50 is coupled only to platen 14, it is believed apparent that the chain connection requires that both platens move by exactly equal amounts in opposite directions, either simultaneously toward or simultaneously away from reference plane RP.

Because of the fact that chain sections 56 and 64 accurately regulate and synchronize motion of the two platens 12 and 14 relative to each other, accurate regulation of hydraulic motors 24 and 26 is not essential and the only requirement for motors 24 and 26 is that they be actuated to drive in the same direction at the same time with a force sufficient to move the platens.

Figure 4:
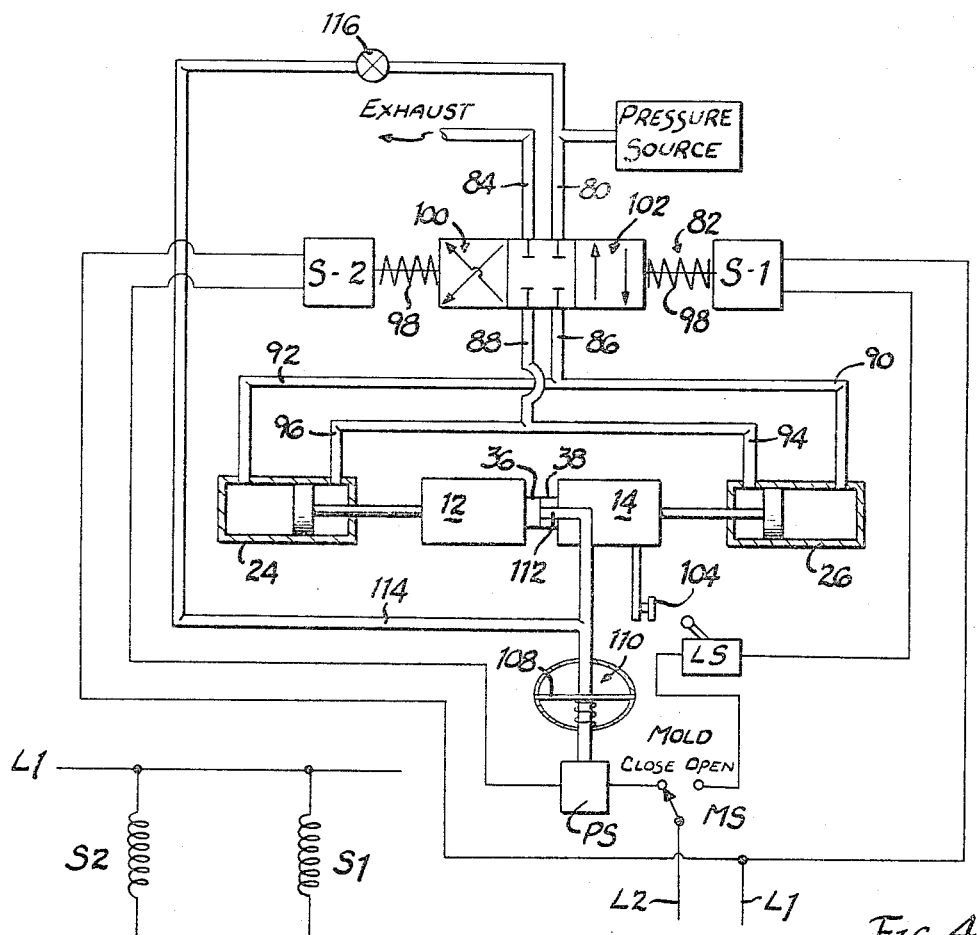
FIGURE 4 is a schematic diagram of the electrical and hydraulic connections of the apparatus of FIGURE 1.

The hydraulic control circuit for motors 24 and 26 is schematically illustrated in FIGURE 4. A schematically illustrated pressure source capable of supplying the desired operating pressure is connected via a pressure conduit 80 to a three position four-way reversing valve designated generally 82. An exhaust conduit 84 is connected to valve 82 as are control conduits 86 and 88 respectively. Conduit 86 is connected by branch conduits 90 and 92 to the head ends of the cylinders of motors 24 and 26, while conduit 88 is connected by branch conduits 94 and 96 to the respective rod ends of the cylinders of motors 24 and 26.

Valve 82 is shown schematically in FIGURE 4 in its neutral or non-actuated position in which conduits 80, 84, 86 and 88 are all blocked within the valve. Valve 82 assumes the neutral position shown in FIGURE 4 at any time at which neither of valve operating solenoids S1 and S2 are energized, valve 82 being so positioned by centering springs 98. Energization of solenoid S1 will shift valve 82 to align the set of cross connections within the valve designated generally 100 with the pressure, exhaust and control conduits to connect conduit 80 to conduit 88 and to connect conduit 86 to exhaust conduit 84. This connection will supply pressure to the rod end of both motors 24 and 26 and would exhaust the head ends of the respective motors to retract the piston rods into their respective motors, thereby moving platens 12 and 14 apart.

To drive the platens to their illustrated mold closed positions, solenoid S2 is energized to align the parallel connections within the valve, indicated generally at 102 with the pressure, exhaust and control conduits. With solenoid S2 energized, pressure conduit 80 is connected via control conduit 86 to the head ends of motors 24 and 26, while exhaust conduit 84 is placed in communication with the rod ends of motors 24 and 26 via conduits 88, 94 and 96.

The mold closed and mold open positions of platens 12 and 14 are established by connecting into the energizing circuit of solenoids S1 and S2 normally closed switches which are adapted to be opened in response to the arrival of the platens at the desired position. In the case of the mold open position, a limit switch LS is mounted upon frame 10 with its actuator disposed in the path of movement of an actuating cam 104 which is adjustably mounted on a threaded rod 106 carried on mold platen 14.

The mold closed position is established by a pressure-actuated switch PS which is normally closed and opened in response to an increase in pressure against a spring-loaded diaphragm 108. Diaphragm 108 is mounted to define one side of a closed chamber designated generally 110 which is in communication with an orifice 112 which opens at the front side of a pad 38 on mold platen 14. Orifice 112 and chamber 110 are connected to the pressure source via a conduit 114 which, in the usual case, will be provided with a pressure-reducing restriction as at 116. When platens 12 and 14 are away from their mold closed positions, orifice 112 is unobstructed and pressure from the pressure source passing through conduit 114 is vented through the open orifice 112. When the mold platens reach their closed position, pad 36 on platen 12 blocks orifice 112, thereby causing pressure in conduit 14 and diaphragm chamber 110 to build up. This increase in pressure in chamber 110 flexes diaphragm 108 downwardly as viewed in FIGURE 4 to open the contacts of pressure switch PS.

Figure 5:
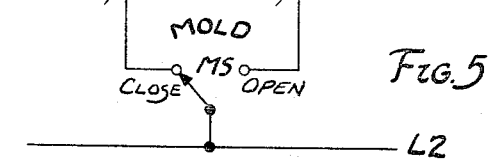
FIGURE 5 is a schematic diagram of the electrical control circuit of FIGURE 4.

Motors 24 and 26 are actuated to selectively drive the mold platens toward their open or closed positions by a two-position mold switch MS. The electrical connections are most clearly shown in FIGURE 5, electric power being supplied across supply lines L1 and L2. In FIGURES 4 and 5, mold switch MS is shown actuated to the mold closed position which establishes a circuit from supply line L2 via pressure switch PS and solenoid S2 to the opposite side of the electrical supply L1. As indicated in FIGURE 5, pressure switch contacts PS are normally closed and, as explained above, these contacts are opened when pad 36 seats against pad 38 to block orifice 112. As explained above, the increase in pressure upon blocking of orifice 112 opens contacts PS, thereby de-energizing solenoid S2 and permitting valve 82 to return to the illustrated neutral position of FIGURE 4 in which pressure conduit 80, exhaust conduit 84 and control conduits 86 and 88 are all blocked within the valve, thereby locking motors 24 and 26 in the illustrated position.

To shift the mold platens to their open position, the movable contact of mold switch MS is shifted to the open position, thereby completing a circuit from supply line L2 through the mold switch, normally closed contacts LS and solenoid S1 to supply line L1, thereby energizing solenoid S1. Energization of solenoid S1 shifts valve 82 to position the cross connections 100 in operative relationship with the supply and control conduits, to connect pressure source 80 to the rod ends of motors 24 and 26 while connecting the head ends of the respective motors to exhaust conduit 84. With this hydraulic connection established, both motors stroke in a direction drawing the piston rods into the cylinder, and movement of the pistons in this direction continues until cam 104 strikes the actuator of limit switch LS to open the corresponding contacts LS in FIGURE 5, thereby breaking the circuit through solenoid S1. As in the previous case, the energization of the solenoid permits centering springs 98 to return valve 82 to the neutral position illustrated in FIGURE 4. In the usual case, mold switch MS is automatically actuated in response to the movement of the parisons to the mold.

It should be noted that both mold positioning control elements are mounted on mold platen 14 and the position of this platen, through the endless chain formed by chain sections 56 and 64 accurately establishes the corresponding position of mold platen 12.

While one exemplary embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

I claim:

1. Blow molding apparatus comprising a frame, a pair of mold half platens mounted on said frame at opposite sides of an imaginary stationary reference plane, means supporting said platens on said frame for guided movement toward and away from each other and said reference plane, motor means coupled to each platen, means for actuating said motor means to simultaneously drive said platens toward each other and said reference plane to a mold closed position or to simultaneously drive said platens away from each other and said reference plane to a mold open position, sprocket means mounted in said frame for free rotation at locations spaced outwardly from said reference plane beyond the mold open position of said platens, means defining an endless chain trained about said sprocket means and extending between said sprocket means in oppositely movable runs extending parallel to the direction of movement of said platens, means fixedly coupling one of said platens to one of said runs, and means fixedly coupling the other platen to the other of said runs to thereby maintain said platens at equal distances from said reference plane throughout their full range of movement relative to said frame.

2. Blow molding apparatus comprising a frame, a pair of mold half platens mounted on said frame at opposite sides of an imaginary stationary reference plane, means supporting said platens on said frame for guided movement toward and away from each other and said reference plane, independent motor means coupled to each platen, means for actuating both motor means to simultaneously drive said platens toward each other and said reference plane to a mold closed position or to drive said platens away from each other to a mold open position, first control means responsive to the arrival of one of said platens at its mold closed position for stopping both of said motor means, second control means responsive to the arrival of said one of said platens at its mold open position for stopping both of said motor means, sprocket means mounted in said frame for free rotation at locations spaced outwardly from said reference plane beyond the mold open position of said platens, means defining an endless chain trained about said sprocket means and extending between said sprocket means in oppositely movable runs extending parallel to the direction of movement of said platens, means fixedly coupling one of said platens to one of said runs, and means fixedly coupling the other platen to the other of said runs to thereby maintain said platens at equal distances from said reference plane throughout their forward range of movement relative to said frame.

3. Blow molding apparatus comprising a frame, a pair of mold half platens having generally planar face portions disposed in opposed parallel facing relationship to each other at opposite sides of an imaginary stationary reference plane parallel to said face portions, means supporting said platens on said frame for movement toward and away from each other in a direction normal to said reference plane with said face portions maintained in parallel relationship with each other, a reversible platen drive motor coupled to each platen, control means for simultaneously actuating both motors to drive the platens toward each other or away from each other, sprocket means mounted in said frame for free rotation at locations spaced outwardly from said reference plane beyond the mold open position of said platens, means defining an endless chain trained about said sprocket means and extending between said sprocket means in oppositely movable runs extending parallel to the direction of movement of said platens, means fixedly coupling one of said platens to one of said runs, means fixedly coupling the other platen to the other of said runs to thereby maintain said platens at equal distances from said reference plane throughout their full range of movement relative to said frame, and movement-limiting means on one of said platens connected to said control means to limit movement of said platens to respective ranges of movement extending from a preselected minimum distance from said reference plane corresponding to a mold closed position to a preselected maximum distance from said reference plane corresponding to a mold opened position.

4. Blow molding apparatus comprising a frame, a pair of mold half platens having generally planar face portions disposed in opposed parallel facing relationship to each other at opposite sides of an imaginary stationary reference plane parallel to said faces, means supporting said platens for movement toward and away from each other in a direction normal to said reference plane with said faces maintained in parallel relationship with each other, a reversible platen drive motor coupled to each platen, control means operable in a first position to actuate both motors to drive the platens toward each other and operable in a second position to simultaneously actuate both motors to drive the platens away from each other, said control means being operable in a third neutral position to stop operation of both motors, sprocket means mounted in said frame for free rotation at locations spaced outwardly from said reference plane beyond the mold open position of said platens, means defining an endless chain trained about said sprocket means and extending between said sprocket means in oppositely movable runs extending parallel to the direction of movement of said platens, means fixedly coupling one of said platens to one of said runs, means fixedly coupling the other platen to the other of said runs to thereby maintain said platens at equal distances from said reference plane throughout their full range of movement relative to said frame, first means responsive to movement of one of said platens to a distance of closest approach to said reference plane to shift said control means from said first position to said neutral position to thereby establish a mold closed position of said platens relative to each other and to said frame, and second means on said one of said platens responsive to movement of one of said platens to a maximum distance from said reference plane for shifting said control means from said second position to said neutral position to thereby establish a mold open position of said platens.

5. Blow molding apparatus comprising a frame, a pair of mold half platens mounted on said frame at opposite sides of an imaginary stationary vertical reference plane and having opposed front faces facing said reference plane, means supporting said platens on said frame for horizontal forward and rearward movement toward and away from each other in a path normal to said reference plane, sprocket means mounted on said frame for free rotation about a vertical axis at locations spaced rearwardly from said platens, a pair of inextensible chains trained about said sprocket means, each chain having parallel runs extending forwardly from its sprocket means, means at one end of each chain securing the chain to one of said platens, means at the other end of each chain securing each chain to the other of said platens whereby each chain is attached to both platens to constrain said platens to move by equal and opposite distances toward and away from said reference plane, and means coupled to each platen for driving said platens toward and away from each other.

6. Blow molding apparatus comprising a frame, a pair of mold half platens mounted on said frame at opposite sides of an imaginary stationary vertical reference plane and having opposed front faces facing said reference plane, means supporting said platens on said frame for horizontal forward and rearward movement toward and away from each other in a path normal to said reference plane, a first and a second sprocket mounted for free rotation in said frame about spaced vertical axes located rearwardly of one of said platens, an inextensible chain secured at one end to one of said platens and extending rearwardly therefrom to said first sprocket, laterally from said first sprocket to said second sprocket and forwardly from said second sprocket to the other of said platens, means securing the other end of said chain to said other of said platens whereby movement of one of said platens away from said reference plane is transmitted by said chain to the other of said platens to constrain said other platen to move away from said reference plane, and motor means coupled to each of said platens for moving said platens toward and away from said reference plane.

References Cited

UNITED STATES PATENTS 3,044,112  7/1962  Perry _____ 18—5

FOREIGN PATENTS 1,147,301  6/1957  France.

WILBUR L. McBAY, *Primary Examiner.*

MICHAEL V. BRINDISI, *Examiner.*